United States Patent
Tsai et al.

(10) Patent No.: US 6,571,726 B2
(45) Date of Patent: Jun. 3, 2003

(54) DEVICE FOR MONITORING GEAR LEVER POSITION

(75) Inventors: Jimmy Tsai, Fang Yuan (TW); Chi-Liang Chiang, Taipei (TW); Bou-Yi Ou, Taipei (TW); Shang-Fei Wu, Taipei (TW)

(73) Assignee: Sunrace Roots Enterprise Co., Ltd., Tao Yuan Hsien (TW)

( * ) Notice: Subject to any disclaimer, the term of this patent is extended or adjusted under 35 U.S.C. 154(b) by 0 days.

(21) Appl. No.: 09/842,816

(22) Filed: Apr. 27, 2001

(65) Prior Publication Data

US 2002/0157594 A1 Oct. 31, 2002

(51) Int. Cl.$^7$ .............................. B62M 25/04
(52) U.S. Cl. ................ 116/28.1; 74/489; 116/284; 116/305
(58) Field of Search .............. 74/473.14, 489; 116/28.1, 284, 299, 305, 309

(56) References Cited

U.S. PATENT DOCUMENTS

| | | | | | |
|---|---|---|---|---|---|
| 4,895,455 | A | * | 1/1990 | Horning | 116/304 |
| 5,134,897 | A | * | 8/1992 | Romano | 74/473.13 |
| 5,476,019 | A | * | 12/1995 | Cheever et al. | 74/473.13 |
| 5,676,020 | A | * | 10/1997 | Jordan et al. | 74/473.14 |
| 5,799,541 | A | * | 9/1998 | Arbeiter | 74/489 |
| 6,244,207 | B1 | * | 6/2001 | Chen | 116/28.1 |
| 2001/0022035 | A1 | * | 9/2001 | Veloce | 33/758 |

* cited by examiner

Primary Examiner—Diego Gutierrez
Assistant Examiner—Tania C. Courson
(74) Attorney, Agent, or Firm—Troxell Law Office PLLC

(57) ABSTRACT

A device for monitoring a gear lever position includes one internal tube, one external tube, one adjust handle, one cover and one flexible piece. The internal tube has one ring-shape outer rim, one slot formed on the outer rim and one hollow and axial sheath. A convex fish-shaped lens is located on an imagine line from a rider's eyes to the position ring, the imagine line not being perpendicular to the axial sheath. Via the design of the convex fish-shaped lens, the position symbols are enlarged. The window only shows single position symbol in use. Thus, rider easily monitors and knows the actual gear lever position.

13 Claims, 8 Drawing Sheets

DEVICE FOR MONITORING GEAR LEVER POSITION

FIELD OF THE INVENTION

This invention is about a device for monitoring the position of a gear lever, especially about the device installed on handle of bicycle for monitoring gear lever position, and further that rotating handle to shift gear lever.

BACKGROUND OF THE INVENTION

There are two sorts of gear lever shifting for a multi-speed bicycle, one by turning a gear lever, and the current fashion is by rotating a handle to shift a gear lever for changing speed.

However, the device of the current fashion for rotating a handle to shift gear lever does not include a device that monitors the gear lever position. By the traditional way, the bike rider touches the gear lever to sense the shifted gear lever position. On the other hand, the device for current fashion is that the bike rider must directly read the gear lever position symbol (generally it is a numeral) on the gear lever device. For dimensional considerations, the gear lever position symbol is usually not large enough to read easily. Hence, under the conditions of low light, passing through a tunnel, not concentrating on the gear lever position at high speed, not being close to the gear lever device, etc., the gear lever position is not easily and rapidly judged.

SUMMARY OF THE INVENTION

The main object of this invention is to provide a device for easily, rapidly and clearly monitoring the gear lever position.

The second object of this invention is to offer a device for monitoring the gear lever position, even under lightless circumstance.

The third object of this invention is to offer a device for monitoring the gear lever position, which provides an auxiliary light source for the device when under lightless circumstances.

To reach these objects, the invention at least consists of one internal tube, one external tube, one adjust handle, one cover and one flexible piece. The internal tube comprises one ring-shape outer rim, one slot formed on the outer rim and one hollow and axial sheath for fixing to a bike handle. The outer diameter of the sheath is smaller than the inner diameter of the outer rim so as to form a storage space between the sheath and the outer rim. On a suitable position of the slot, there is a window going through and connecting between slot and the storage space. The external tube is a hollow structure and surrounds the sheath, thus, enabling relative rotating motion between external tube and sheath. A position ring for showing the gear lever position is installed on the storage space relative to the external tube. The window is just above the position ring, and a plurality of gear lever position symbols are on the position ring. An adjust handle surrounds the external tube, and they rotate together. Between the internal side of the position ring of the external tube and the external side of the sheath, is set a flexible piece. The cover wraps inside the slot, and a fish-shaped lens is set on the cover. The fish-shaped lens is a convex lens, and the position for the fish-shaped lens is located on an imagine line from the rider's eyes to the position ring. Defining a line Z that is perpendicular to the axial direction of the sheath and the foresaid imagine line is line S, the angle between line Z and line S is from 25 to 70 degrees. The design is to amplify the position symbols of window, and further that window shows only a single position symbol so as to not confuse the rider.

In a preferred embodiment, the position symbols are made by fluorescence, therefore, rider can easily read symbols in lightless circumstances, such as passing through tunnels.

In another preferred embodiment, a position of the outer rim of the internal tube relative to the window has a light source for lighting up the position ring, such that, the symbols are still readable even in lightless circumstances.

The further preferred embodiment includes, installed on the outer rim of internal tube, an electrical source and a switch. The electrical source controls a light source via the switch.

The fourth preferred embodiment is that the light source is a LED.

The fifth preferred embodiment includes a wire guide on the internal tube. The wire guide is hollow to enable a speed-change wire, to pass through, then passing by internal tube and connecting both ends, to the transmission device and external tube. Rotating the external tube for tightening and loosening the speed-change wire, and the transmission device is controlled to change speed as well.

For further understanding the invention, following is the description with drawings for the invention.

DETAILED DESCRIPTION OF THE PREFERRED EMBODIMENT

One of the features of the invention is the window design, which only shows the position symbol in use. The window with a cover having a convex fish-shaped lens is another feature, the fish-shaped lens being position in between an imagine line from a rider's eyes to the window. The imagine line is not perpendicular to the window, and there is an angle between the imagine line and the line vertical to the window. Via the design of the convex fish-shaped lens, the position symbols are enlarged. The window only shows a single position symbol in use. Thus, the rider easily monitors and knows the actual gear lever position.

Following is listed several preferred embodiments for detail structure, motion, effect and other features of a device for monitoring a gear lever position according to the invention.

Figure 1:
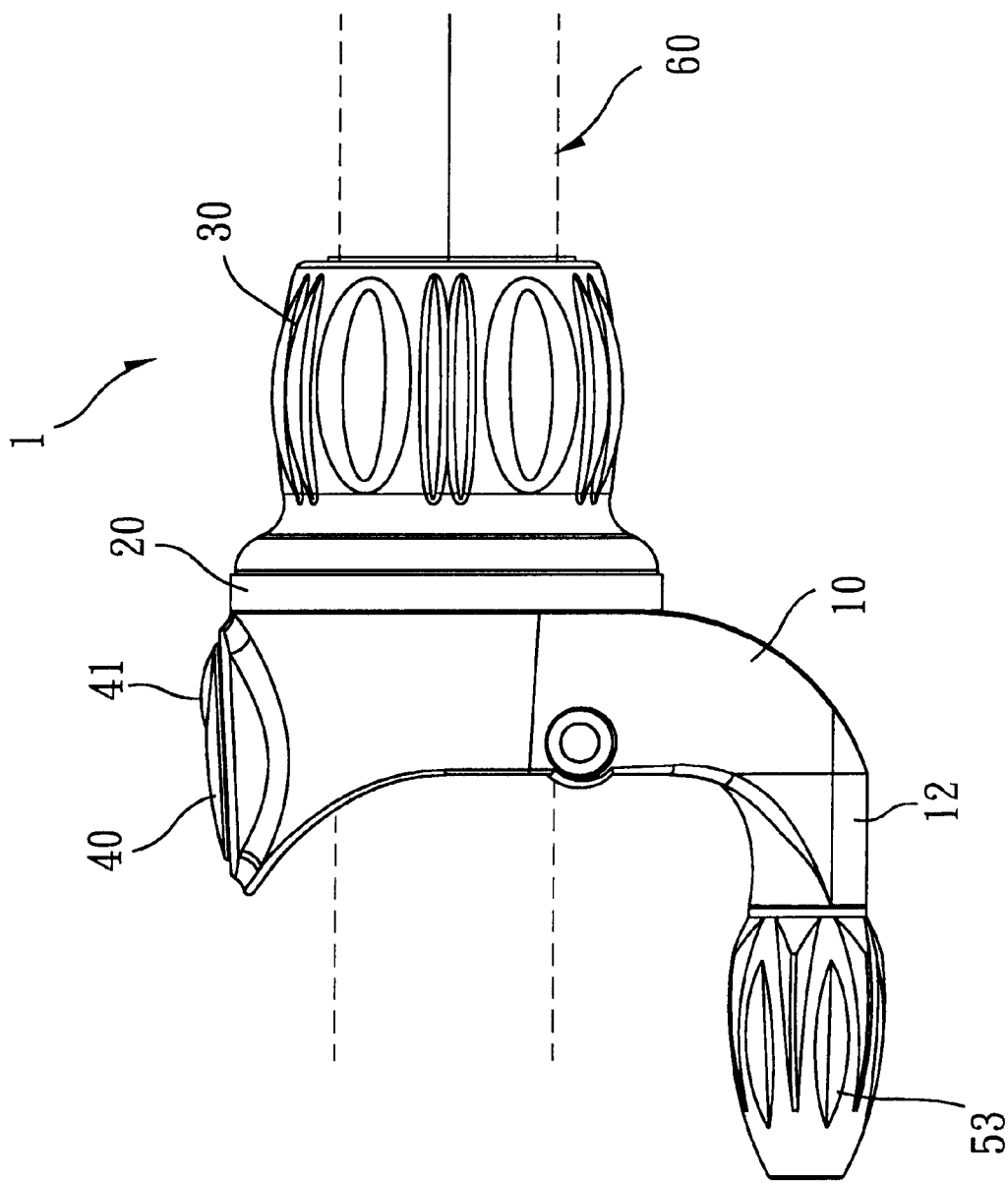
FIG. 1 is the side view of the preferred embodiment of a device for monitoring a gear lever position according to the invention.
Figure 2:
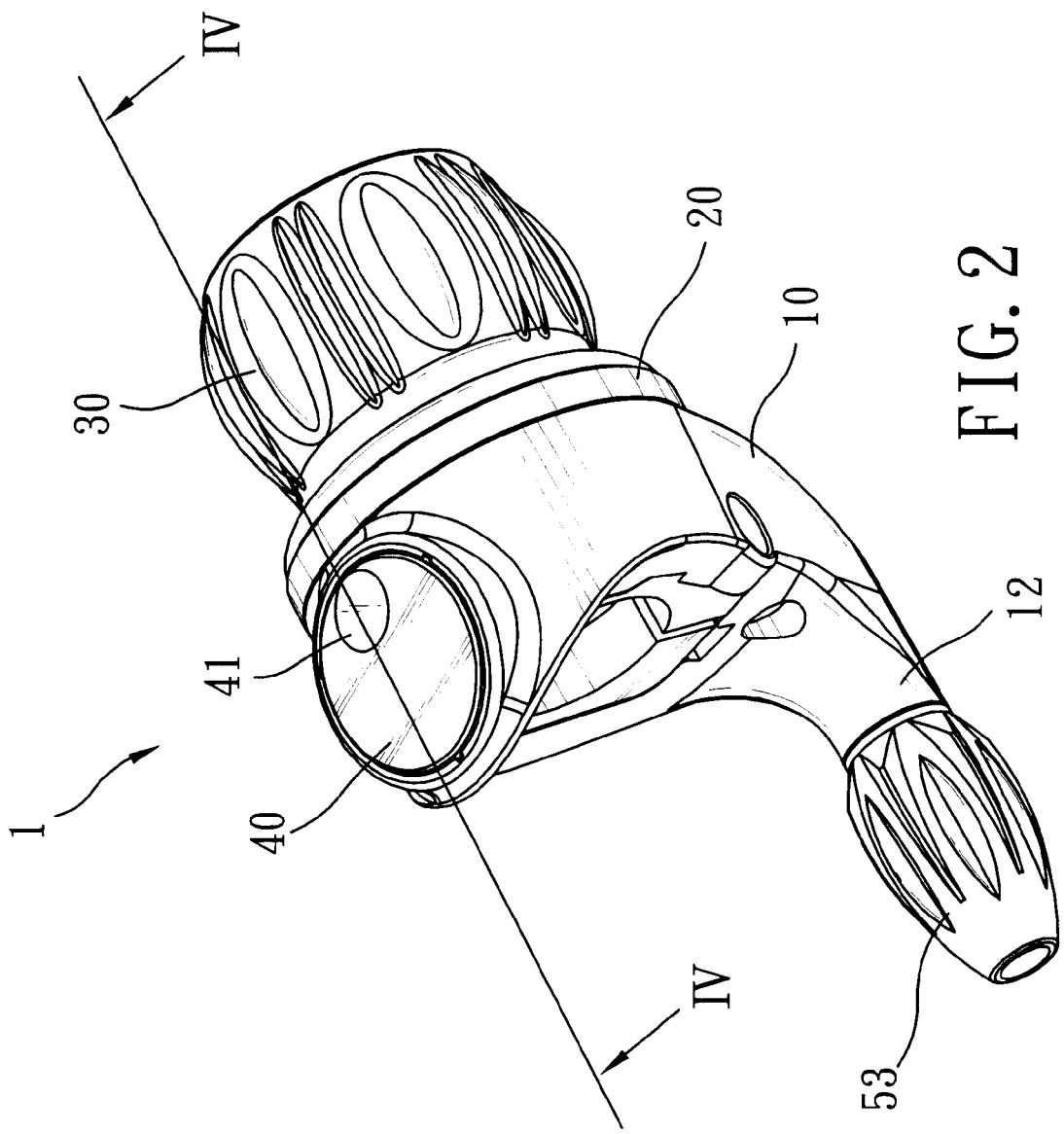
FIG. 2 is a perspective view of a device for monitoring gear lever position as shown in FIG. 1.
Figure 3:
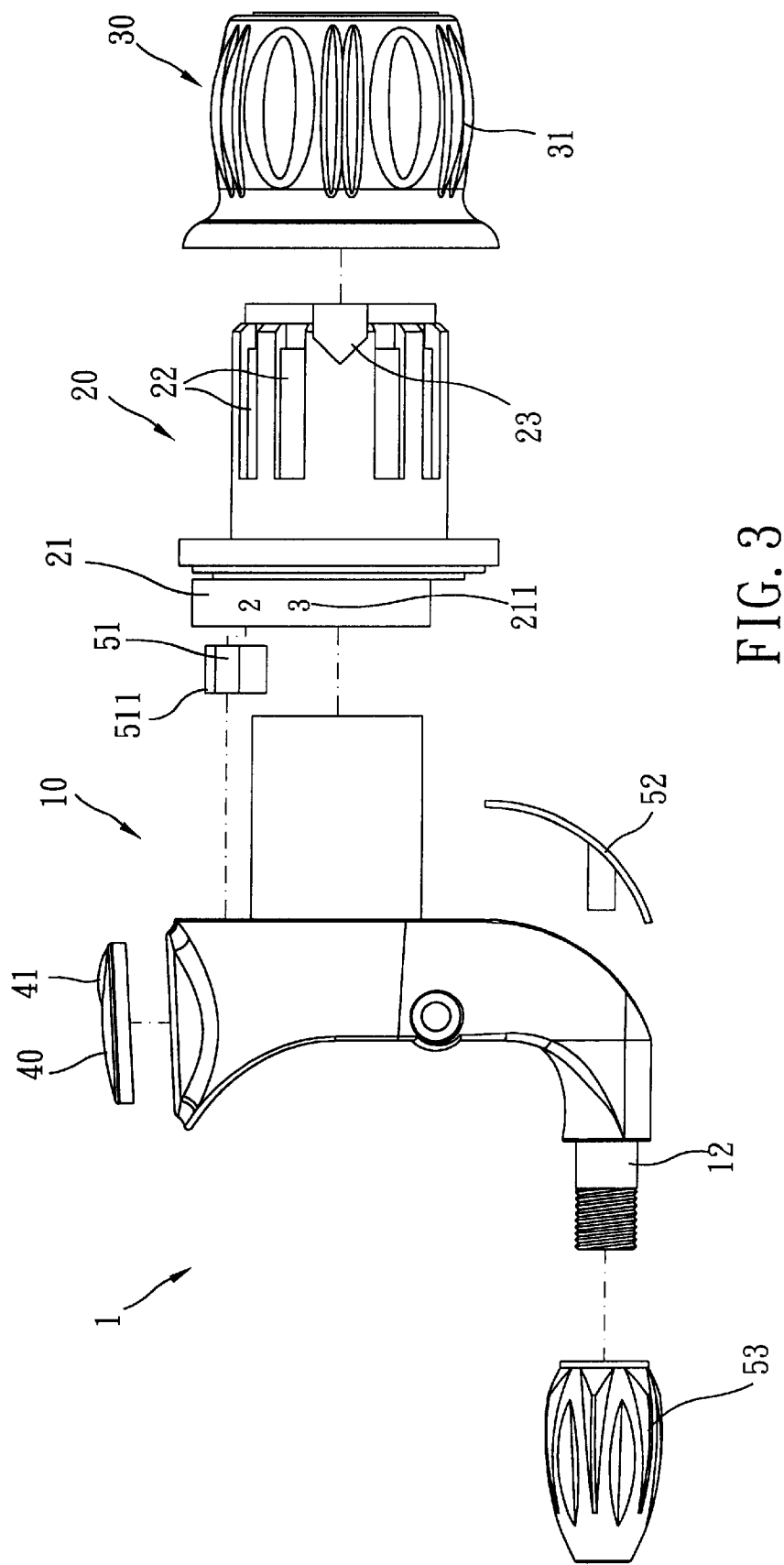
FIG. 3 is an exploded view of a device for monitoring gear lever position as shown in FIG. 1.
Figure 4:
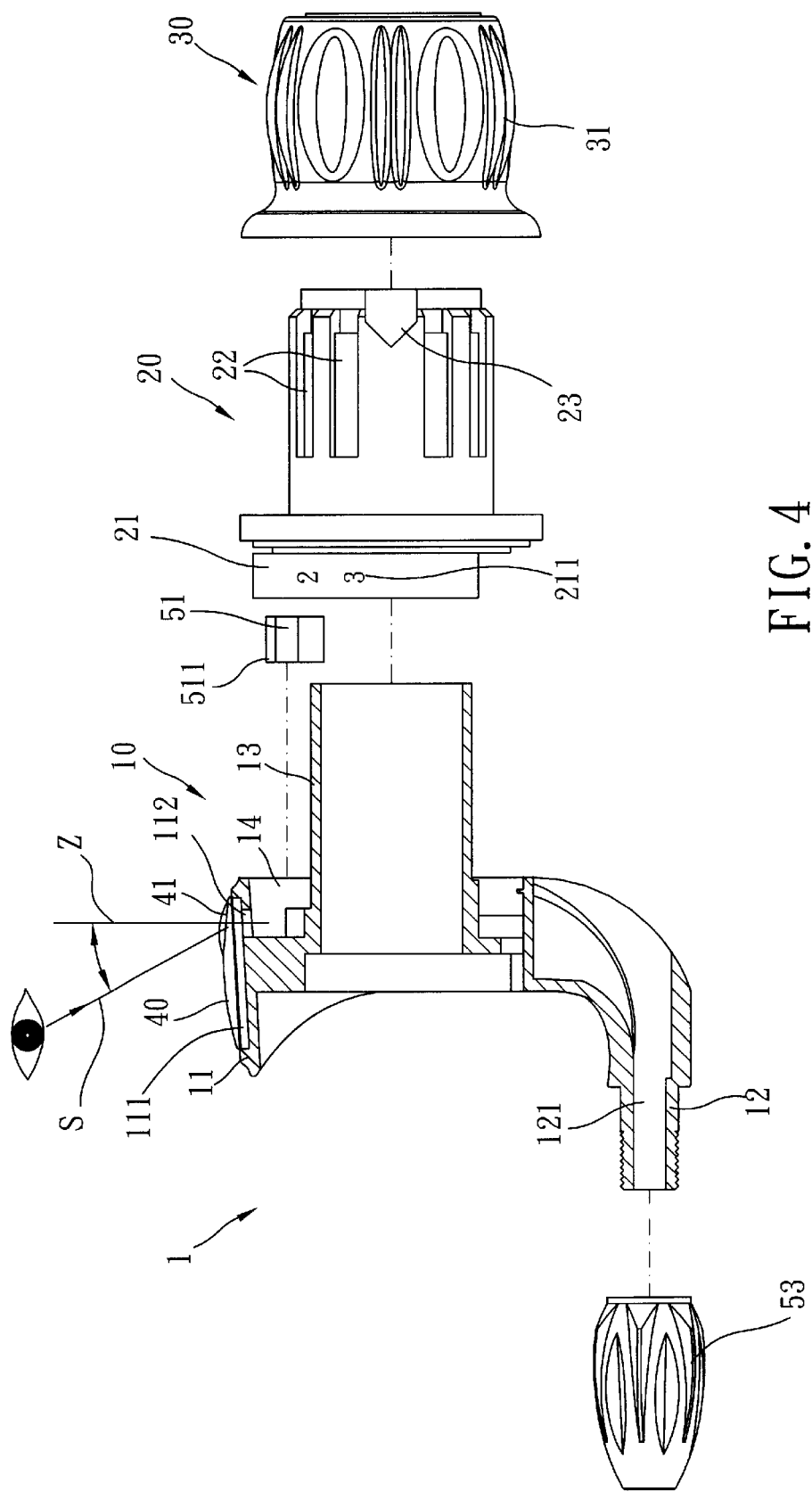
FIG. 4 is an exploded, cross-sectional view of internal tube 10 in FIG. 2 (external tube 20 and adjust handle 30 not shown) taken along line IV—IV in FIG. 2.

Refer to FIG. 1 to FIG. 4, which is the first preferred embodiment of the invention. Wherein, FIG. 1 is the side view of the preferred embodiment of a device for monitoring gear lever position for the invention, FIG. 2 is the three-dimensional view, FIG. 3 is the detail drawing, FIG. 4 is the cross-sectional view of internal tube 10 in FIG. 2 (external tube 20 and adjust handle 30 not shown).

The device 1 for monitoring gear lever position comprises of an internal tube 10, an external tube 20, an adjust handle 30, a cover 40, a flexible piece 51, a shield 52 and a nut 53.

The internal tube 10 is made of plastic, by injection molding or casting, comprising of an outer rim 11 with ring shape, a slot 111 formed on suitable position of the said outer rim 11, a wire guide 12 and an axial sheath 13 fixed on the handle 60 of a bike (not shown in figure). Wherein, the outer diameter of sheath 13 is smaller than the inner diameter of outer rim 11, thus, there is a ring storage space 14 formed in between the outer rim 11 and sheath 13. A window 112 is set a suitable position on slot 111 for connecting the slot 111 and the storage space. The wire guide 12 on internal tube 10 includes a channel 121 for a speed-change wire (not shown in figure) passing from the channel 121 to the storage space 14 of internal tube 10.

External tube 20 is a hollow module, which surrounds the sheath 13 and is movable relative to the sheath 13. In the preferred embodiment, the external tube 20 is made of plastic by injection molding or casting. The position of external tube 20 in the storage space 14 includes an arc-shaped position ring 21. After assembly, window 112 of internal tube 10 is aligned with position ring 21. There are a plurality of position symbols 211 on position ring 21 representing gear lever position, such as numerical symbols, alphabets, literal symbols, etc. Herein, the position symbols 211 on position ring 21 are on a strip sticker with printed symbols adhered onto position ring 21. Alternatively, the symbols may be directly printed on position ring 21. Further, those symbols may be fluorescent to enable the rider easily monitoring them when in lightless circumstances.

Adjust handle 30 surrounds external tube 20, and there is a buckling structure between an inner surface of adjust handle 30 and the outer surface of external tube 20, so that external tube 20 and adjust handle 30 can thus rotate together. In the preferred embodiment, the buckling structure is comprised of a plurality of axial grooves 22 on the outer surface of external tube 20, and a plurality of convex strips (not shown in figure) on the inner surface of adjust handle 30. The grooves 22 and the convex strips are relatively positioned for buckling up. The buckling structure can be other prior arts as well. Adjust handle 30 is a soft material, such as rubber, silicon or other plastic. A plurality of convex ribs or flipper-shape structures are set on the outer surface of adjust handle 30 for improving comfort and stability of holding and rotating.

Between the inner surface of position ring 21 and the other surface of sheath 12 is a flexible piece 51. A fixing point 511 on flexible piece 51 is against into one of a plurality of concave points (not shown in figure) on the inner surface of position ring, such that each concave point fixes the gear lever on that point and represents a gear lever position. The flexible piece 51 and relative structures are prior art.

Wire guide 12 on the internal tube has a screw portion for tightening nut 53. Wire guide 12 also has a channel 121 for a speed-change wire (not shown in figure) passing through from channel 121 of wire guide 12, internal tube 10 and then to a concave seat 23 of external tube 20, and connecting and fixing on a suitable position of external tube 20. Another end of speed-change wire is connected and fixed on a transmission device (not shown in figure). Rotating the external tube 20 to tighten or loosen the speed-change wire causes a speed-change. The connection of nut 53 and speed-change wire and speed-change technology are prior art, and are not further described.

Figure 5:
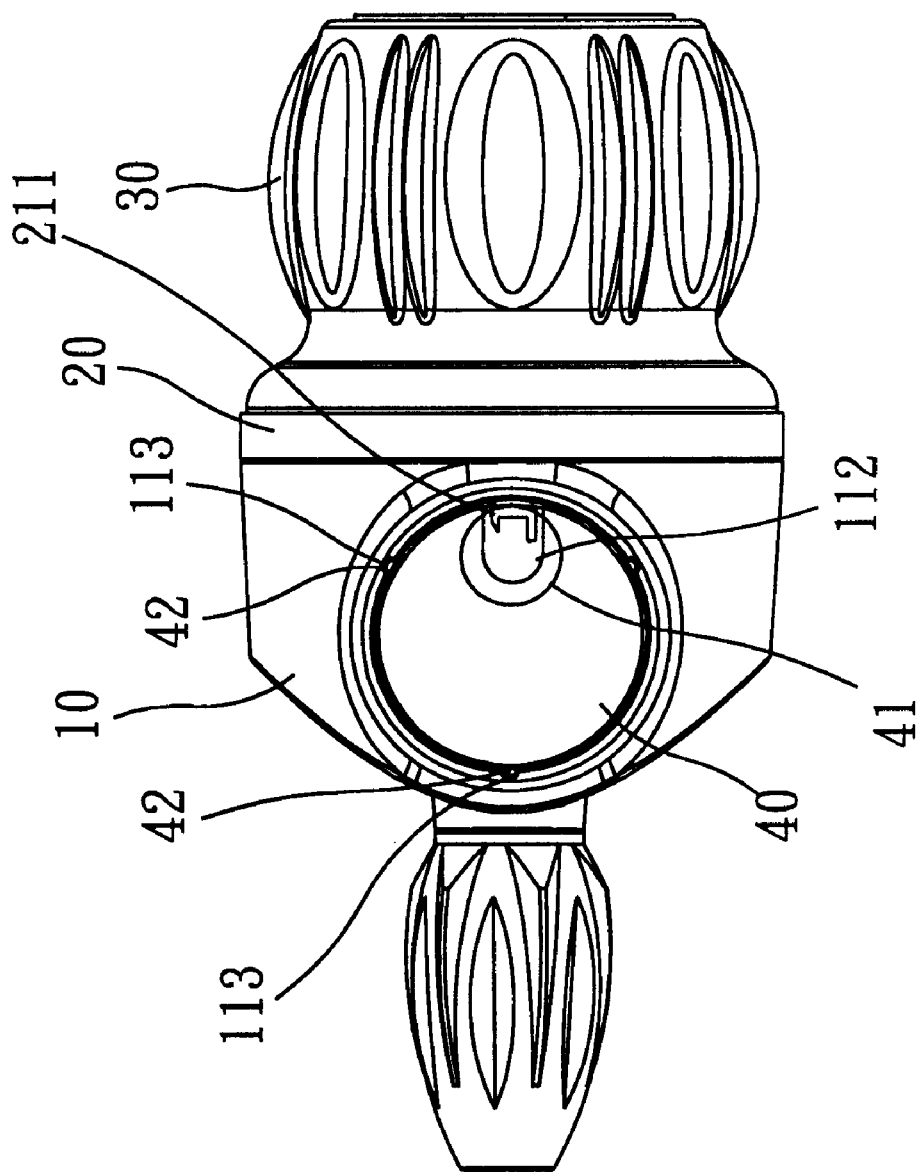
FIG. 5 is the top view of a device for monitoring gear lever position of FIG. 1, showing the relative positions of position symbol 211, window 112 and fish-shaped lens 41.

Please refer to FIG. 4 and FIG. 5, cover 40 is mounted in inside slot 111. A convex fish-shaped lens 41 is on the cover 40, and is positioned in between an imagine line extending from a rider's eyes, through window 112 to position ring 21. The fish-shaped lens 41 is the important feature of the invention. Normally, the imagine line from the rider's eyes to the position ring 21 is not vertical to position ring 21, there is an angle between the imagine line and the line perpendicular to position ring 21. If the fish-shaped lens 41 is aligned with the central window 112, the enlarging effect of the convex fish-shaped lens 41 is not reached, and the rider is easily confused by deformed symbols. As shown in FIG. 4, a line Z is perpendicular to sheath 13 passing through window 112, the foresaid imagine line is defined as line S. Thus the angle between line Z and line S is between 25 to 70 degrees. Therefore, the fish-shaped lens 41 enlarges the position symbols 221, and the rider then monitors those symbols easily.

Figure 6:
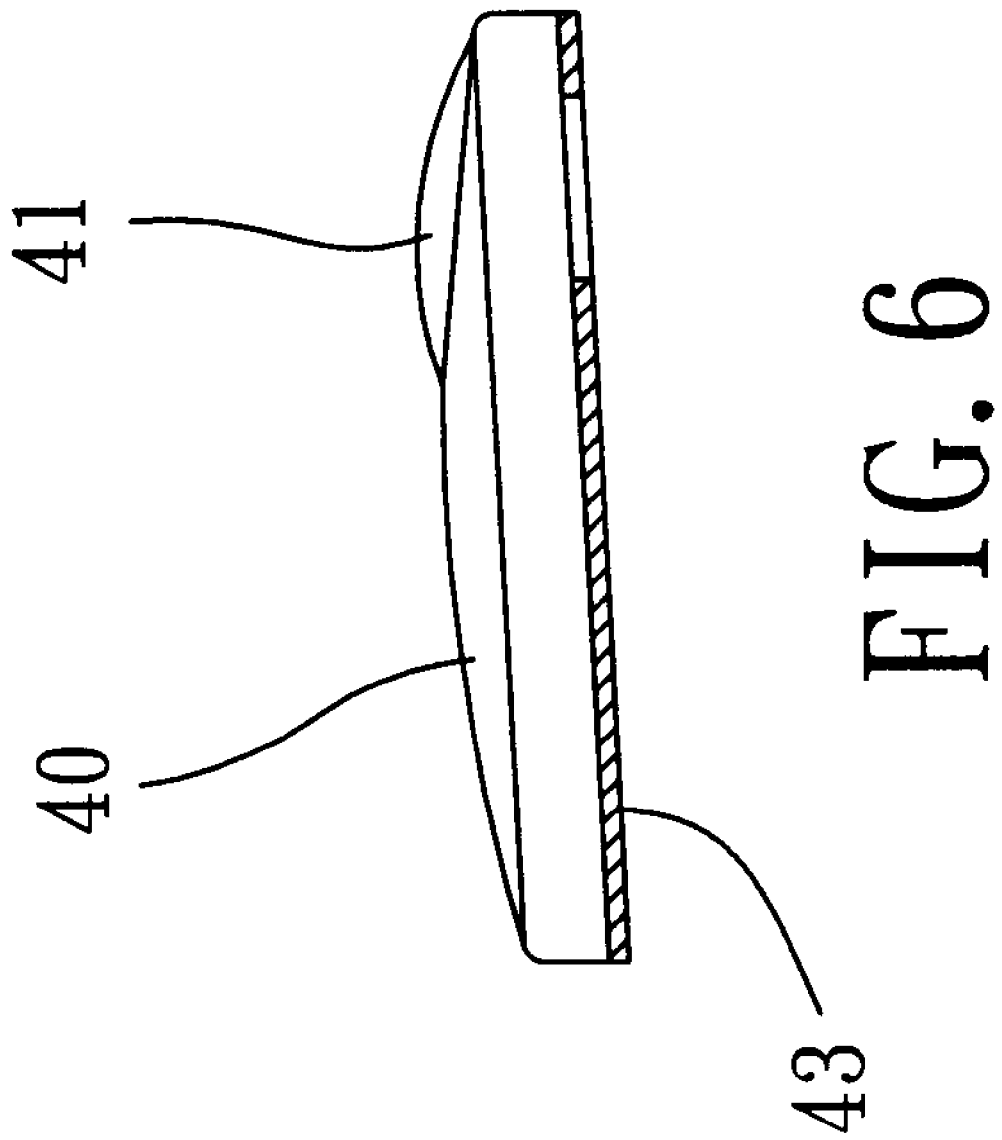
FIG. 6 is another embodiment of cover 40 of a device for monitoring a gear lever position according to the invention.

Referring to FIG. 5, both the rims of cover 40 and slot 111 have plural positioning structures which are relative each other such as convex points 42 and concave points 113. The plural positioning structures are not set proportionally on the two rims (generally called go/no go structure). Thus, cover 40 only inserts into slot 111 in single direction for buckling. Further, the relative positions for buckling are not missed when assembling fish-shaped lens 41 and window 112. Referring to FIG. 6, the side surface of cover 40 toward slot 111 can have a printed diagram 43 for shielding other portions except window 112, for instance, a trade mark, product number, etc. Another embodiment, the diagram 43 can be printed on single shielding piece, and the position on shielding piece relative to window 112 is an open hole. When assembling, the shielding piece is set between cover 40 and slot 111.

Figure 7:
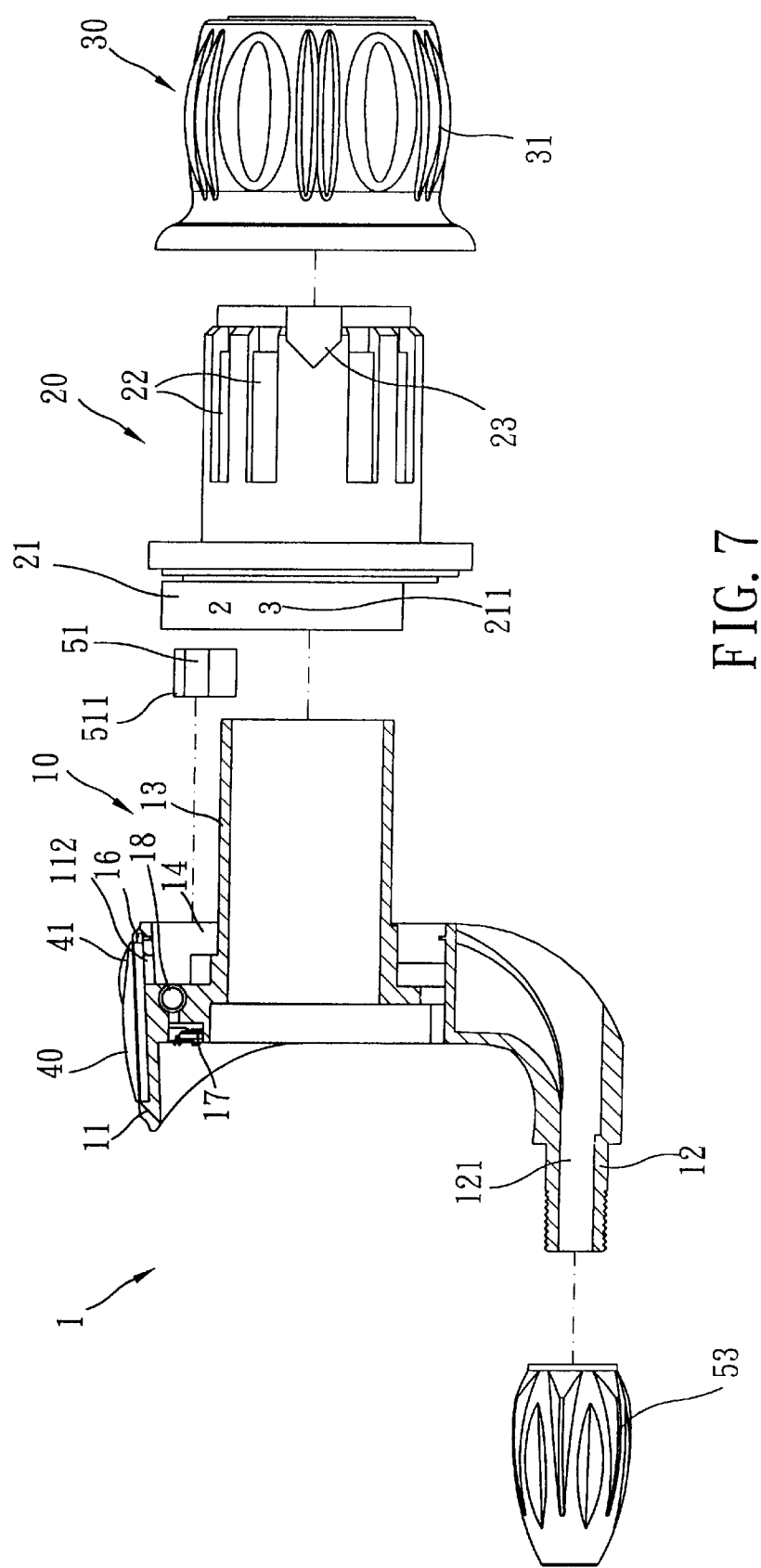
FIG. 7 is the further embodiment of a device for monitoring a gear lever position according to the invention.
Figure 8:
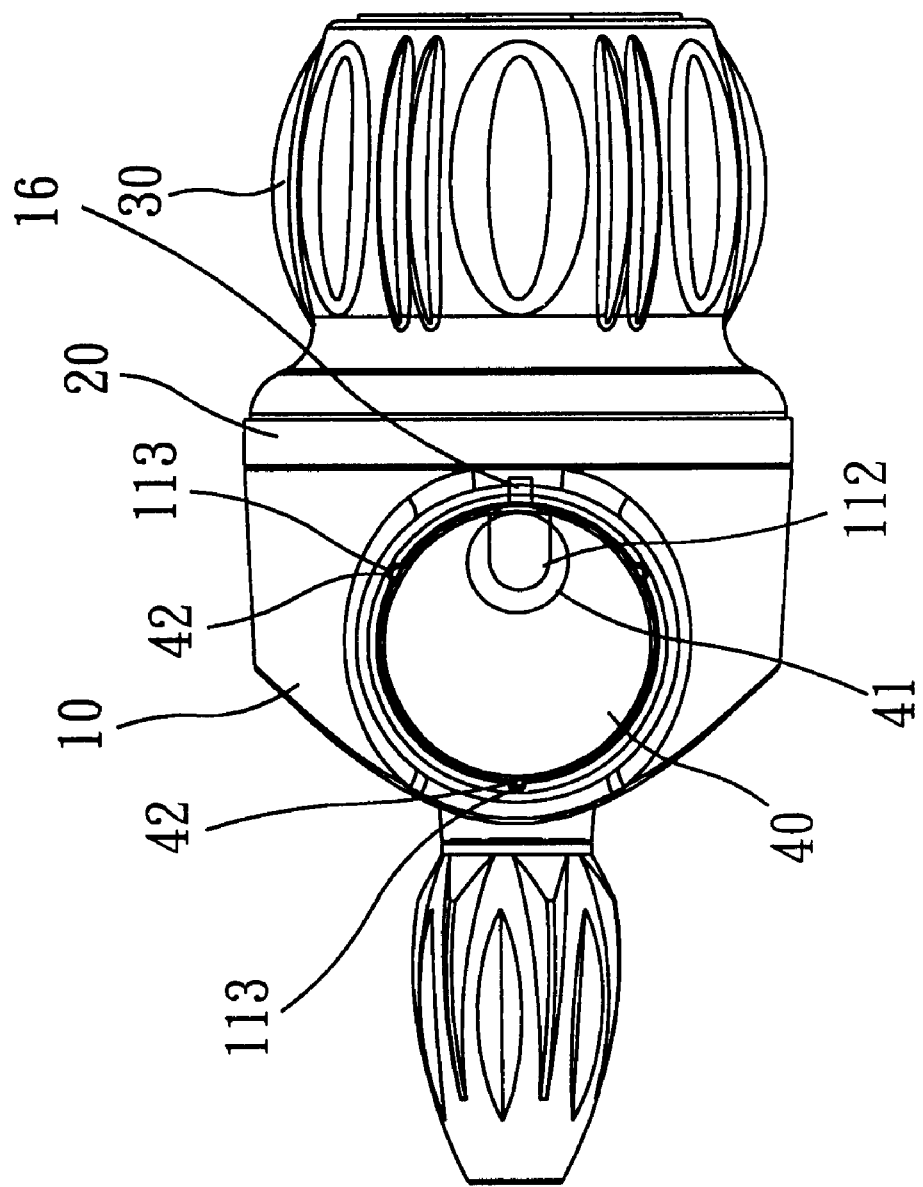
FIG. 8 is the top view of the embodiment in FIG. 7.

Please refer to FIG. 7 to FIG. 8, which illustrate another preferred embodiment. This embodiment includes a light source 16, for example a LED, on an outer rim 11 of internal tube 10 relative to window 112, and further related components comprising an electrical source 17 and a switch 18. The electrical source 17 controls light source 16 via switch 18, which means turning the switch on and off to make electrical source 17 and light source 16 work together. Thus, the position ring 21 can light up. Therefore, the position symbols 211 can be seen even at night.

It may thus be seen that the objects of the present invention set forth herein, as well as those made apparent from the foregoing description, are efficiently attained. While the preferred embodiments of the invention have been set forth for purpose of disclosure, modifications of the disclosed embodiment of the invention as well as other embodiment thereof may occur to those skilled in the art. Accordingly, the appended claims are intended to over all embodiments that do not depart from the spirit and scope of the invention.

What is claimed is:

1. A device for monitoring a gear lever position, which can be installed on bike, the device comprising:

an internal tube, including a ring-shaped outer rim, a slot being formed on the outer rim, and a hollow and axial sheath adapted for fixing the device to a bike handle, wherein, an outer diameter of the sheath is smaller than an inner diameter of the outer rim so as to form a storage space between the sheath and the outer rim; a window passing through and connecting the slot and the storage space; and a light source, an electrical source and a switch connected between the electrical source and the light source to turn the light source on and off;

a hollow external tube surrounding the sheath, so as to rotate relative to the sheath, and including a position ring for showing a gear lever position located in the storage space, aligned with the window; and a cover mounted in the slot on the internal tube, the cover having a convex fish-shaped lens eccentrically mounted thereon so as to be located on line S from a rider's eyes to the position ring, the line S forming an angle with a line Z passing through the window and perpendicular to an axial direction of the sheath of between 25 and 70 degrees.

2. The device for monitoring a gear lever position as cited in claim 1, wherein, a plurality of position symbols are on the position ring, the position symbols printed on a strip sticker that is adhered to the position ring.

3. The device for monitoring a gear lever position as cited in claim 1, wherein, a plurality of fluorescent position symbols are formed on the position ring.

4. The device for monitoring a gear lever position as cited in claim 1, wherein, a side surface of the cover toward the slot has a printed diagram.

5. The device for monitoring a gear lever position as cited in claim 1, wherein a shielding piece is located between the cover and the slot, with a diagram printed on the shielding piece.

6. The device for monitoring a gear lever position as cited in claim 1, wherein, the light source is a LED.

7. The device for monitoring a gear lever position as cited in claims 1, further comprising rims of the cover and the slot have engaging positioning structures whereby the cover only fits into the slot in a single direction.

8. A device for monitoring a gear lever position, which can be installed on bike, the device includes:

an internal tube, including a ring-shaped outer rim, a slot being formed on the outer rim, and a hollow and axial sheath adapted for fixing the device to a bike handle, wherein, an outer diameter of the sheath is smaller than an inner diameter of the outer rim so as to form a storage space between the sheath and the outer rim; a window passing through and connecting the slot and the storage space;

a hollow external tube surrounding the sheath so as to rotate relative to the sheath and including a position ring for showing a gear lever position located in the storage space aligned with the window; and a cover mounted in the slot in the internal tube, the cover having a convex fish-shaped lens eccentrically mounted thereon so as to be located on line S from a rider's eyes to the position ring, the line S forming an angle with a line Z passing through the window and perpendicular to an axial direction of the sheath of between 25 and 70 degrees.

9. The device for monitoring a gear lever position as cited in claim 8, wherein a plurality of position symbols are formed on the position ring.

10. The device for monitoring a gear lever position as cited in claim 8, wherein a plurality of fluorescent position symbols are formed on the position ring.

11. The device for monitoring a gear lever position as cited in claim 8, wherein, a side surface of the cover toward the slot has a printed diagram.

12. The device for monitoring a gear lever position as cited in claim 8, wherein a shielding piece is located between the cover and the slot, with a diagram printed on the shielding piece.

13. The device for monitoring a gear lever position as cited in claim 8, further comprising rims of the cover and the slot have engaging positioning structures whereby the cover only fits into slot in a single directions.

\* \* \* \* \*